United States Patent [19]
French et al.

[11] Patent Number: 5,881,846
[45] Date of Patent: Mar. 16, 1999

[54] SECURITY DEVICE FOR SHOPPING CARTS AND THE LIKE

[75] Inventors: John R. French; David M. Giuntoli, both of San Diego, Calif.

[73] Assignee: Carttronics LLC, San Diego, Calif.

[21] Appl. No.: 843,954

[22] Filed: Apr. 17, 1997

[51] Int. Cl.⁶ .................................................. B60B 33/00
[52] U.S. Cl. ............................ 188/1.12; 188/5; 188/111; 280/33.994
[58] Field of Search ................... 188/1.12, 4 B, 188/4 R, 5, 6, 7, 19, 31, 60, 62, 69, 161, 167, 111, 110; 280/33.994; 16/35 R

[56] References Cited

U.S. PATENT DOCUMENTS

| | | |
|---|---|---|
| 1,671,774 | 5/1928 | McIntosh . |
| 2,759,738 | 8/1956 | Reiter . |
| 2,812,041 | 11/1957 | Mugler . |
| 2,964,140 | 12/1960 | Berezny . |
| 3,031,037 | 4/1962 | Stollman . |
| 3,031,038 | 4/1962 | Chait . |
| 3,044,577 | 7/1962 | Lotz . |
| 3,083,398 | 4/1963 | Swalm . |
| 3,157,871 | 11/1964 | Umanoff . |
| 3,217,839 | 11/1965 | Watkins et al. . |
| 3,272,527 | 9/1966 | Martin . |
| 3,305,064 | 2/1967 | Mullis et al. . |
| 3,356,185 | 12/1967 | Isaacks . |
| 3,366,201 | 1/1968 | Pesta . |
| 3,495,688 | 2/1970 | Isaacks . |
| 3,652,103 | 3/1972 | Higgs . |
| 3,719,370 | 3/1973 | Gintick et al. . |
| 3,751,757 | 8/1973 | Stosberg et al. . |
| 3,804,211 | 4/1974 | Scherzinger . |
| 3,892,295 | 7/1975 | Hahto . |
| 4,199,043 | 4/1980 | Lankester et al. . |
| 4,242,668 | 12/1980 | Herzog . |
| 4,424,511 | 1/1984 | Alberts, Jr. . |
| 4,503,943 | 3/1985 | Tsukui . |
| 4,524,985 | 6/1985 | Drake . |
| 4,577,880 | 3/1986 | Bianco . |
| 4,580,800 | 4/1986 | Upton et al. . |
| 4,591,175 | 5/1986 | Upton et al. . |
| 4,609,075 | 9/1986 | Snedeker . |
| 4,683,461 | 7/1987 | Torre . |
| 4,772,880 | 9/1988 | Goldstein et al. . |
| 4,809,824 | 3/1989 | Fargier et al. . |
| 5,315,290 | 5/1994 | Moreno et al. . |
| 5,394,962 | 3/1995 | Gray . |
| 5,432,412 | 7/1995 | Harris et al. . |
| 5,465,984 | 11/1995 | Pellegrini, Jr. et al. . |
| 5,499,697 | 3/1996 | Trimble et al. . |

FOREIGN PATENT DOCUMENTS

| | | |
|---|---|---|
| 2053630 | 4/1971 | France . |
| WO 95/13953 | 5/1995 | WIPO . |
| WO 95/20515 | 8/1995 | WIPO . |
| WO 96/21206 | 7/1996 | WIPO . |

*Primary Examiner*—Robert J. Oberleitner
*Assistant Examiner*—Pamela J. Lipka
*Attorney, Agent, or Firm*—Brown, Martin, Haller & McClain, LLP

[57] ABSTRACT

A security apparatus for a shopping cart having a plurality of casters has a braking member rotatably mounted on a wheel axle of one of the wheels. The braking member is movable between a raised position spaced above the ground surface and an operative position contacting the ground surface, and has a portion projecting radially outwardly from the outer peripheral rim of the wheel at least in the operative position so as to lift the wheel from the ground and impede rotation of the wheel. A locking device releasably locks the braking member in the raised position, and is released by a trigger device in response to a signal from a signal system extending around an area in which carts are to be retained, at which point the braking member rotates into the operative position.

18 Claims, 5 Drawing Sheets

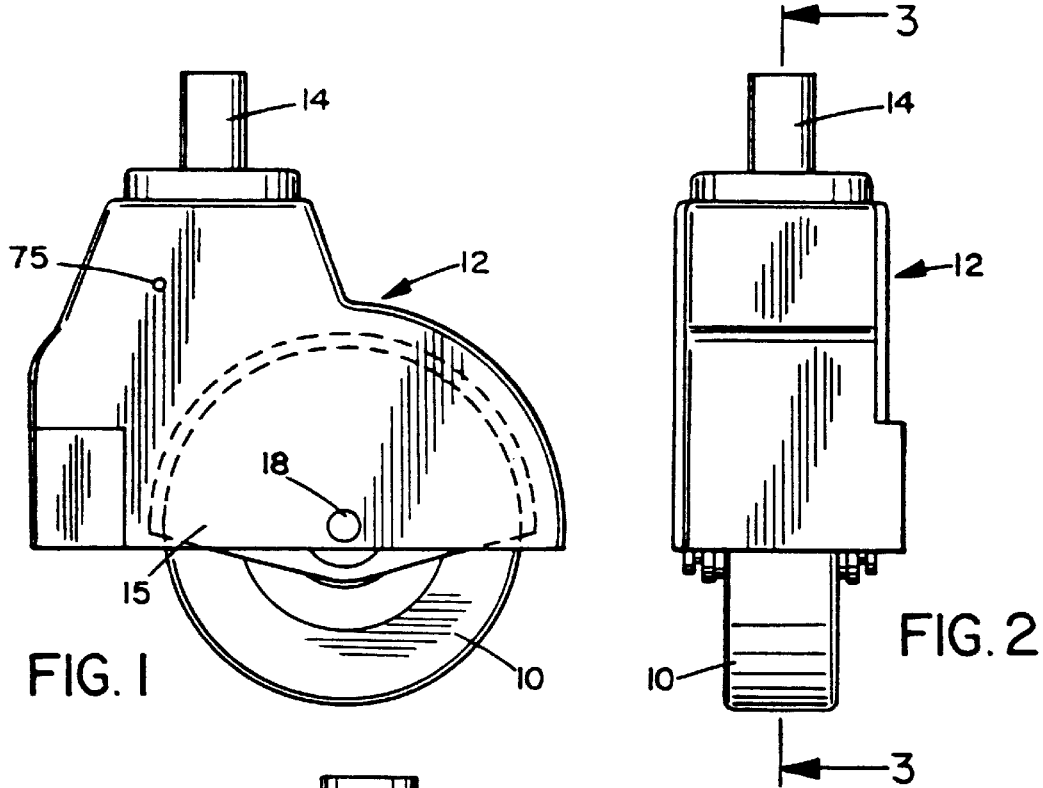
FIG. 1
FIG. 2
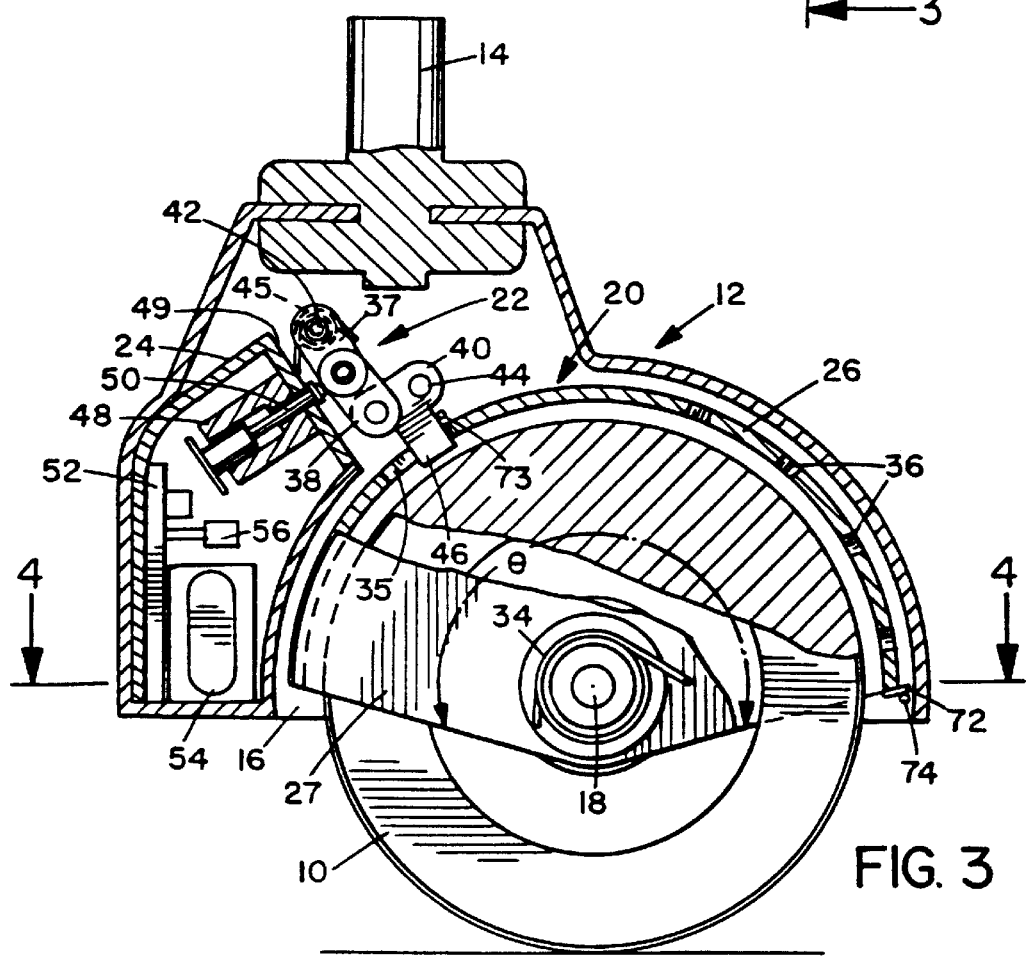
FIG. 3

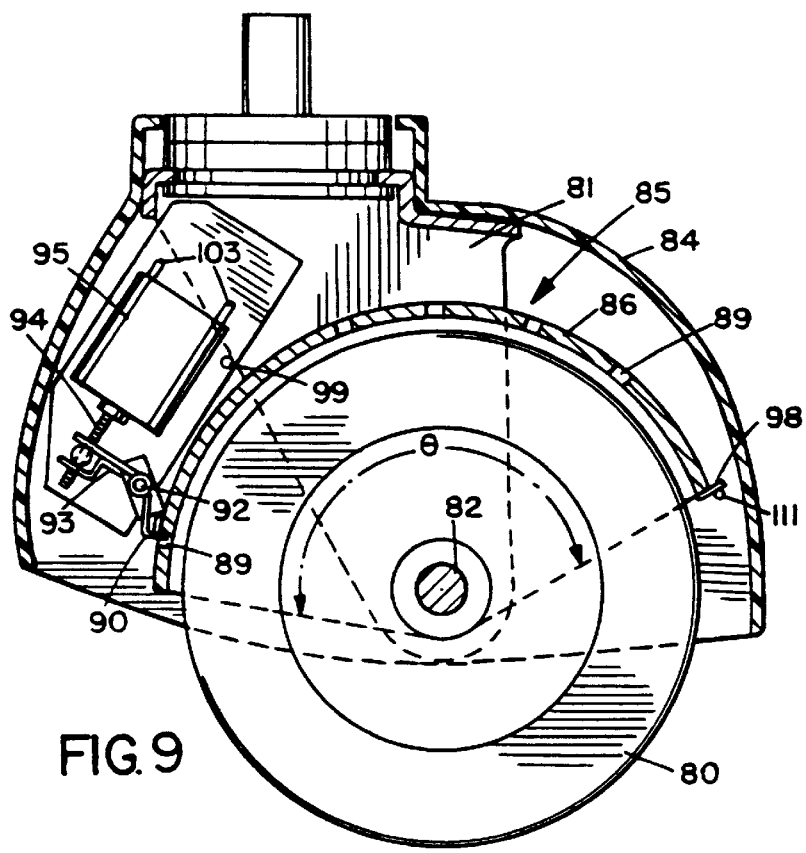
FIG. 9
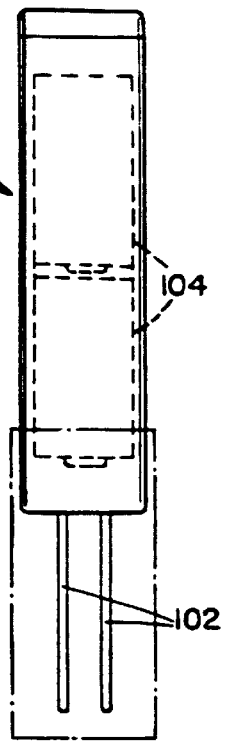
FIG. 12
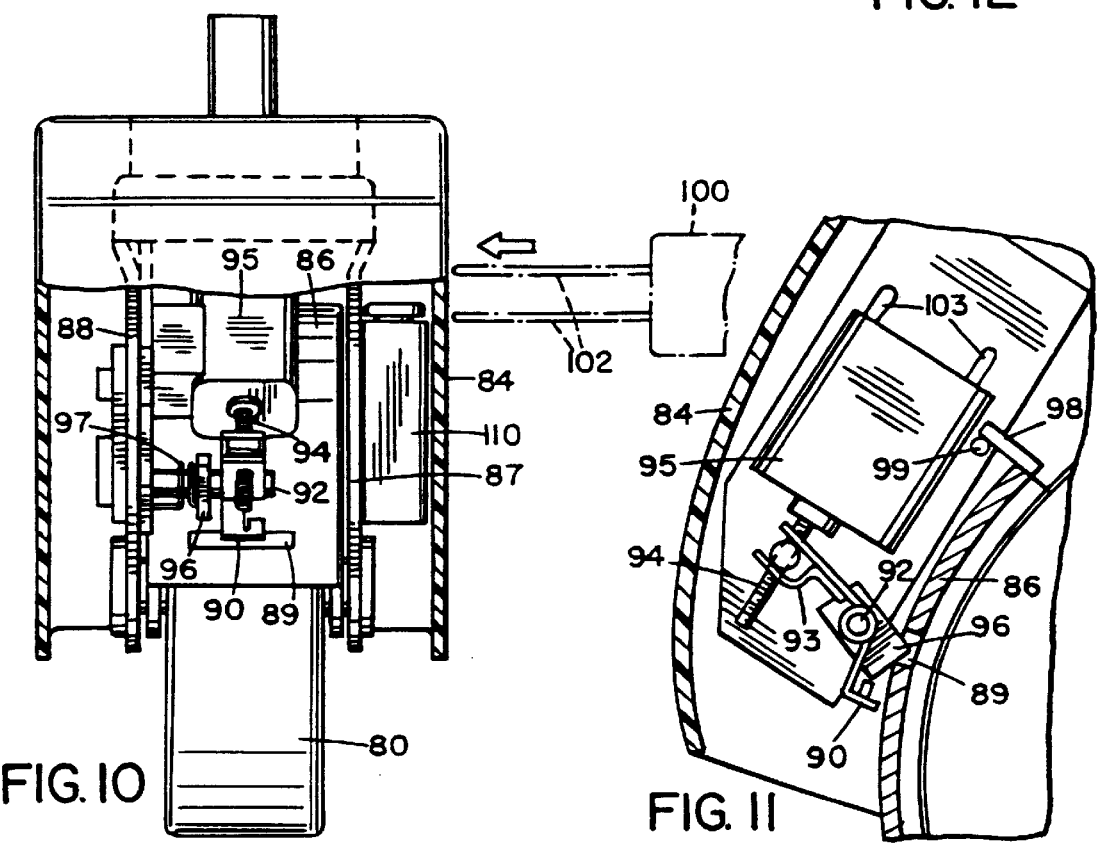
FIG. 10
FIG. 11

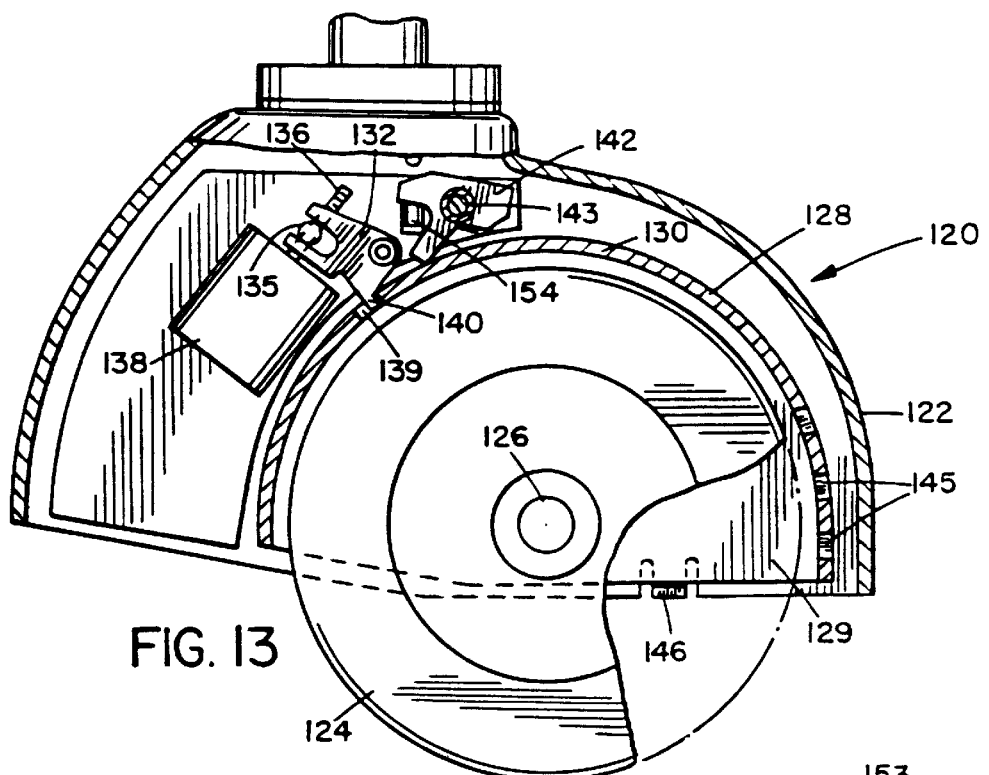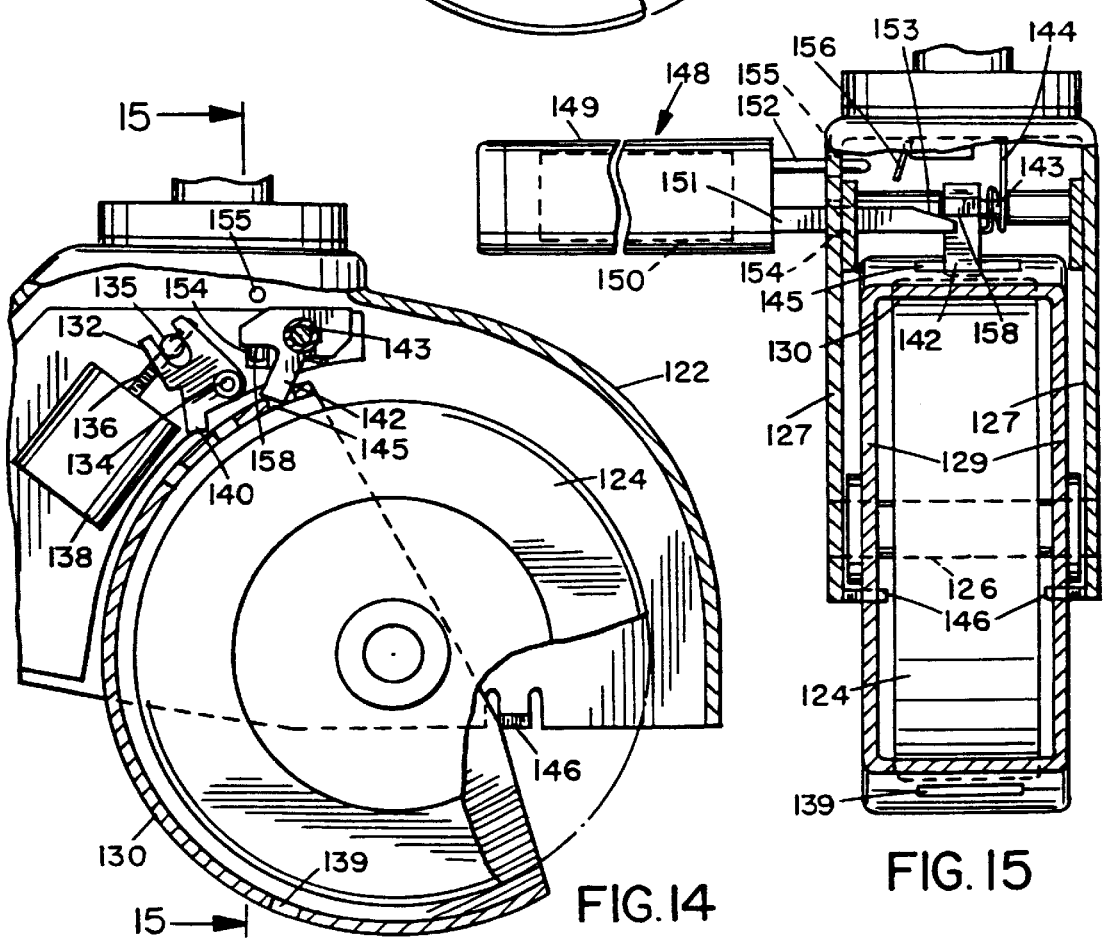

SECURITY DEVICE FOR SHOPPING CARTS AND THE LIKE

BACKGROUND OF THE INVENTION

The present invention relates generally to security or locking devices for wheeled vehicles, and is particularly concerned with a locking device for a shopping cart.

Wheeled shopping carts are conventionally provided by supermarkets and other large stores for the convenience of shoppers, so that relatively large loads of goods can be collected, paid for, and then wheeled out to the shopper's vehicle for unloading. The empty cart is then collected by store personnel and returned to the store for subsequent use. The problem with this system is that carts are often removed from the store parking lot, for various reasons. One reason for such removal is that a shopper with no vehicle will use the cart to transport goods back to their home, and then often does not return the cart. This can result in permanent loss or theft of the cart. Loss of shopping carts adds significantly to the cost of operating stores or markets, since each cart is a relatively expensive item.

Numerous proposals have been made in the past for devices to deter shoppers or others from removing carts from the immediate vicinity or parking lot of a store. Such devices typically include some type of wheel locking mechanism which is activated when the cart crosses a boundary of some type around the perimeter of the parking lot. Up to now, these devices have had significant disadvantages and have not been adopted to any great extent due to the disadvantages or problems in implementing them. For example, some mechanisms are highly complex and liable to failure or improper operations. Other such mechanisms are too easy to circumvent to be effective. Some locking mechanisms are too difficult to deactivate when the cart is removed to the proper area. Others are liable to cause damage to the cart wheels or the ground surface when deployed. In other cases, the locking devices are so expensive that they add considerable cost to the carts. Another problem with such devices is that store personnel retrieving carts and nesting them together will have no way of knowing which carts have locked wheels. When the resultant "snake" of carts is pushed back to the store, locked wheels slide on the ground and are liable to be damaged.

One prior art locking device is described in U.S. Pat. No. 4,609,075 of Snedeker. This device comprises a ground contacting probe which is deployed by a magnetic triggering assembly when the cart is rolled over a magnetic strip at an outer perimeter of the parking area. The probe contacts the ground and lifts an adjacent cart wheel off the ground, disabling the cart. However, if a person attempts to push the cart at this point, dragging the probe along the ground, damage to the ground surface and probe may occur.

In U.S. Pat. No. 5,394,962 of Gray, a braking device for a wheeled vehicle includes a braking member which contacts the ground and lifts the vehicle to impede further movement. Again, the device is triggered by a magnet to release a blocking member, allowing the braking member to move into an activated position. Other shopping cart braking devices include stops which extend into openings in one or more wheels, preventing rotation of the wheel. Again, the locked wheel may then be dragged along the ground if a person still attempts to push the cart, damaging the tire.

SUMMARY OF THE INVENTION

It is an object of the present invention to provide a new and improved security device for a wheeled vehicle such as a shopping cart, which deters theft or removal of the vehicle or cart from a designated area, such as a store parking lot.

According to one aspect of the present invention, a security apparatus or device for a shopping cart having a plurality of caster wheels is provided, which comprises a braking member rotatably mounted on a caster wheel axle for movement between a raised position spaced above the ground surface and an operative position contacting the ground surface, the braking member having a portion projecting radially outwardly beyond the outer peripheral rim of the wheel at least in the operative position so as to lift the wheel from the ground and impede movement of the cart. A locking device is provided for releasably locking the braking member in the raised position, and a trigger device releases the locking device in response to a signal from a signal system extending around an area in which carts are to be retained. Preferably, the locking device also automatically locks the braking device in the operative position until it is released by a suitable re-setting device only provided to store personnel.

The braking member may be of any suitable shape providing the necessary projecting portion for raising the wheel from the ground in the operative position, such as an eccentrically mounted disc or partial disc mounted parallel and spaced from one face of the wheel and having at least a portion of larger diameter than the wheel diameter. In a preferred embodiment of the invention, the braking member comprises a part-circular, hollow shell enclosing a portion of the wheel, the shell having an outer, arcuate wall spaced outwardly from the outer peripheral rim of the wheel, and spaced, parallel side walls extending over opposite side faces of the wheel and rotatably mounted on the wheel axle on opposite sides of the wheel. The side walls are sector-shaped and the shell may enclose only a small portion of the wheel or up to half of the wheel.

The locking and trigger devices are preferably mounted within a wheel support yoke adjacent the shell. In a preferred embodiment of the invention, the shell has first and second spaced openings into which a locking device projects in the retracted position and the operative position, respectively. The locking device may comprise a retractable lock member biased into an advanced position extending into one of the two openings, and the trigger device retracts the locking device out of the first opening when actuated. The retracted locking device may be biased back into the second opening when the shell reaches the operative position, holding the shell in this position to disable the cart. Alternatively, a second lock member may be biased into the second opening when the shell reaches the operative position.

The trigger device may comprise a switch, a solenoid, or a motor actuated by a suitable barrier device such as a buried perimeter antenna. The shell may be biased into the operative position by a spring or the like, or may be positively driven by a motor from the inoperative or retracted position into the operative position when released.

Since the locking or braking shell completely encloses part of the wheel, it protects the wheel against damage when immobilized, since no action on the part of the person attempting to remove the cart can cause the wheel to drag along the ground. The security device is effective in deterring cart removal while protecting vulnerable caster wheels against damage.

According to another aspect of the present invention, a combined caster and security device is provided, which comprises a wheel supporting yoke, a wheel axle secured to the yoke, a wheel rotatably mounted on the axle, a braking member rotatably mounted on the axle and rotatable relative to the wheel between a retracted position and an operative position contacting a surface beneath the wheel so as to lift the wheel from the surface and prevent rotation of the wheel on the surface, a locking device mounted inside the yoke, the locking device being movable between an advanced position locking the braking member in the retracted position, and an inoperative position releasing the braking member, and an actuator for moving the locking device into the inoperative position in response to movement of the wheel outside a predetermined area.

The locking device and actuator are preferably mounted within a housing which partially encloses the wheel, as well as the shell in the retracted position. The housing may be mounted around an existing wheel supporting yoke, or may be designed to replace a conventional wheel supporting yoke.

In one embodiment of the invention, the actuator comprises a solenoid with a plunger which is extended to retract the locking device away from the braking member, and a sensor in the yoke senses travel of the wheel over a buried antenna around the perimeter of the predetermined area. The locking device is preferably biased into locking engagement with the braking member in the operative position so as to prevent unauthorized release of the shell until the cart is returned to the store area. Alternatively, the solenoid plunger may itself comprise the braking member. In another embodiment, the actuator comprises a motor which is switched on to drive a locking latch away from the braking member. The locking device also includes a separate, spring loaded pawl for engaging the braking member in its operative position to prevent release of the braking member by an unauthorized user. The pawl is released by store personnel to permit the braking member to be raised, and the motor is then activated in a reverse direction to drive the latch back into locking engagement with the braking member.

The security apparatus of this invention is relatively simple and inexpensive, and can be installed on existing shopping cart wheels without requiring major modification of the wheel or wheel mount. The braking member or shell protects the wheel against damage when deployed, as well as reducing the risk of damage to the underlying pavement, unlike existing braking devices.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a side elevation view of a caster unit with a security mechanism according to a first embodiment of the invention;

FIG. 2 is a view taken from the left side of FIG. 1;

FIG. 3 is an enlarged sectional view taken on line 3—3 of FIG. 2, showing the mechanism in the armed position;

FIG. 9 is a view similar to FIG. 2, but showing an alternative security mechanism with a motor driven latch;

FIG. 10 is a left side view of the structure of FIG. 9, with the outer cover cut away;

FIG. 11 is an enlarged view of a portion of FIG. 9, with the mechanism in the locked position;

FIG. 12 is a view of a battery operated resetting probe to reset the motor driven latch;

FIG. 13 is a side elevation view of a caster with a security device according to another embodiment of the invention, illustrating the raised, inoperative position;

FIG. 14 is a view similar to FIG. 13, illustrating the actuated position; and

FIG. 15 is a section on the lines 15—15 of FIG. 14.

DESCRIPTION OF THE PREFERRED EMBODIMENTS

FIGS. 1–8 of the drawings illustrate a security apparatus for a wheeled vehicle such as a shopping cart according to a first embodiment of the present invention. The security apparatus is integrated with one wheel 10 of a shopping cart so as to disable the wheel if a person attempts to remove the cart from a designated area, such as a store parking lot. A conventional yoke as normally on casters is replaced by enlarged yoke or housing 12 for enclosing part of the wheel 10 as well as the security apparatus when in the inoperative, armed position of FIG. 1. The housing 12 has a conventional stem 14 which is secured to a shopping cart body (not illustrated). The caster may be a swiveling or non-swiveling caster.

Figure 4:
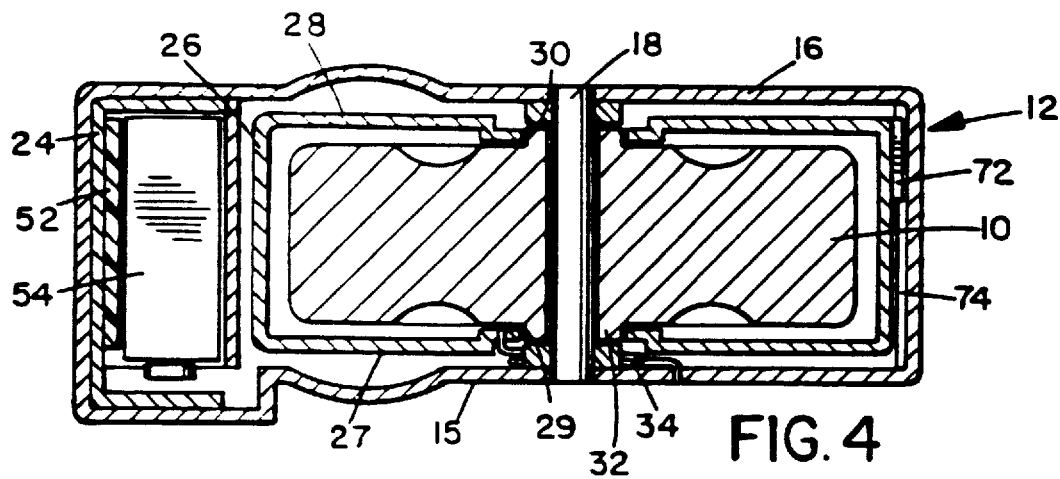
FIG. 4 is a sectional view taken on line 4—4 of FIG. 3.

As best illustrated in FIG. 4, housing 12 has opposite side walls 15,16 extending down on opposite sides of wheel 10. The wheel 10 is rotatably mounted on an axle 18 secured between the housing walls 15,16. The security apparatus basically comprises a braking member or shell 20 rotatably mounted on axle 18 so as to extend over a portion or sector of the wheel 10, a locking device 22 for releasably locking the shell 20 in an inoperative position as in FIG. 1 or an operative position as in FIG. 5, and a triggering module 24 for moving locking device 22 so as to release the shell.

The shell 20, which is preferably of metal or other strong material, has an arcuate wall 26 extending around part of the periphery of wheel 10 but spaced outwardly from the wheel surface so as not to impede its motion when the cart is within the restricted area. A pair of side walls 27,28 extend from opposite sides of wall 26 on opposite sides of wheel 10 in the space between the wheel and housing side walls 15,16, as best illustrated in FIG. 4, so that the shell completely encloses part of the wheel. Each side wall 27,28 is sector-shaped and, in the illustrated embodiment, extends over an angle θ of around 160°. However, it will be understood that the portion of the wheel enclosed by the shell may be greater or lesser than that illustrated in the drawings, and may be a sector having an angle in the range from 20° up to 210°.

The walls 27,28 have aligned openings 29,30 rotatably mounted over opposing hub portions 32 of the wheel 10. Preferably, a spring 34 is secured at one end to housing side wall 15, extends around the axle 18 and is secured at the opposite end to the shell, as best illustrated in FIGS. 3 and 4, so as to bias the shell in a counterclockwise direction. The arcuate wall 26 of the shell has a series of spaced openings around its periphery, including a larger opening 35 and four spaced smaller openings 36.

The locking device 22 comprises a three part latch or linkage having a series of three links 37,38,40. The outer two links 37 and 40 are pivotally mounted on spaced, fixed pivot pins 42,44, while center link 38 has opposite ends hinged or pivoted to the outer links. The first link 37 is biased in a counterclockwise direction by latch spring 45. In the armed or inoperative position of FIG. 3, a locking finger or pawl 46 on the third or lowermost link 40 projects into the larger opening 35 in shell wall 26. In this position, the shell is held over the upper half of the wheel 10 and is located within housing 12, as best illustrated in FIG. 1.

Figure 7:
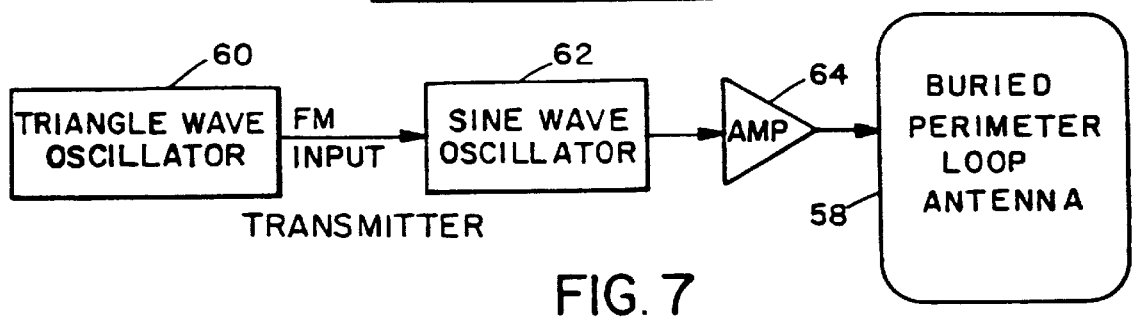
FIG. 7 is a block diagram of the actuating transmitter system.
Figure 8:
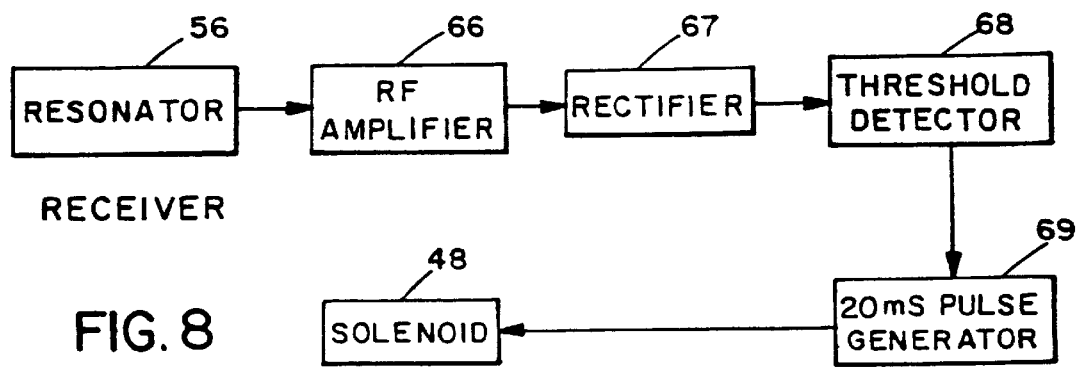
FIG. 8 is a block diagram of the receiver system as installed in the caster.

The actuator module includes an electromechanical actuator such as solenoid 48 secured to an end wall 49 of the module 24 adjacent locking device or linkage 22. Solenoid 48 has a plunger 50 movable between the retracted position of FIG. 3 and the advanced position of FIG. 5. An actuator or receiver circuit is mounted in the module on a printed circuit board 52. The receiver circuit is illustrated in more detail in FIG. 8. A battery power supply 54 operates the actuator circuit. The circuit includes a suitable sensor 56 which detects a signal at the outer perimeter of an area within which the shopping cart is to be kept. In the illustrated embodiment, a buried perimeter loop antenna 58 extends around the perimeter, and is connected to a suitable signal generator as illustrated in FIG. 7. Any suitable signal may be selected which is not liable to interference. In the illustrated embodiment, a triangle wave oscillator 60 is connected to 275 KHz sine wave oscillator 62, and the resultant output is connected via amplifier 64 to the loop antenna 58. It will be understood that other waveforms and frequencies may alternatively be used.

Sensor 56 is designed to detected the output signal of antenna 58 when the shopping cart is close to the antenna. Preferably, sensor 56 comprises a resonator which will resonate at the same frequency as the antenna output signal. The resonator output is connected via RF amplifier 66 and rectifier 67 to a threshold detector 68. If the output is above a predetermined amplitude, a pulse generator 69 is actuated to produce an output pulse which in turn activates solenoid 48 to urge plunger 50 into the extended position of FIG. 5. It will be understood that this is just one example of a suitable circuit for actuating solenoid 48, and other alternative actuators may be used in other embodiments.

Operation of the apparatus will now be described in more detail. During normal use of a cart, the apparatus will be in the armed, inoperative condition of FIGS. 1–3. The latch or locking linkage will be fully extended so that locking pawl 46 extends through opening 35 in the shell and the shell is held in its uppermost position, in which it is raised above the ground and is located almost entirely within the caster housing 12. In this position, the apparatus does not interfere with normal rolling movement of wheel 10 over the floor or ground.

If a user attempts to roll the cart over the buried loop antenna 58 out of the parking lot or other restricted area, the antenna signal will be picked up by sensor or resonator 56, in turn actuating the pulse generator 69 to emit a single pulse. This pulse energizes the solenoid 48 to drive plunger 50 into the extended position of FIG. 5. As the plunger is driven outwardly, it pushes the pivot connection between links 37 and 38 outwardly, collapsing the linkage and simultaneously raising pawl 46 out of opening 35. As soon as the pawl is free of the opening, the shell 20 will rotate downwardly, under the action of biasing spring 34, in the direction of the arrow in FIG. 5. This rotation continues until the shell contacts the ground. After the shell contacts the ground, continued forward motion of the cart will move the shell into the braking position, lifting wheel 10 up off the ground. As the shell rotates, the pawl 46 has a ratcheting action in ratchet openings 36, so that the shell cannot be rotated back in the opposite direction to render it inoperative. A suitable stop device is provided for preventing rotation of the shell beyond the point illustrated in FIG. 5 and 6, for example a stop 72 on the end of shell 20 which engages pin 73 on the shell when the shell reaches the lowermost position, as indicated in FIG. 6. Clearly, pin 73 may comprise any suitable stop mechanism. At this position, pawl 46 projects partially into the final ratchet opening 36 and prevents clockwise movement of the shell, while pin 73 in the housing prevents further movement in a counterclockwise direction. The pawl 46 acts both as the locking member for holding the shell in the raised, inoperative position and the operative position, and as the pawl for ratcheting engagement in openings 36.

Figure 5:
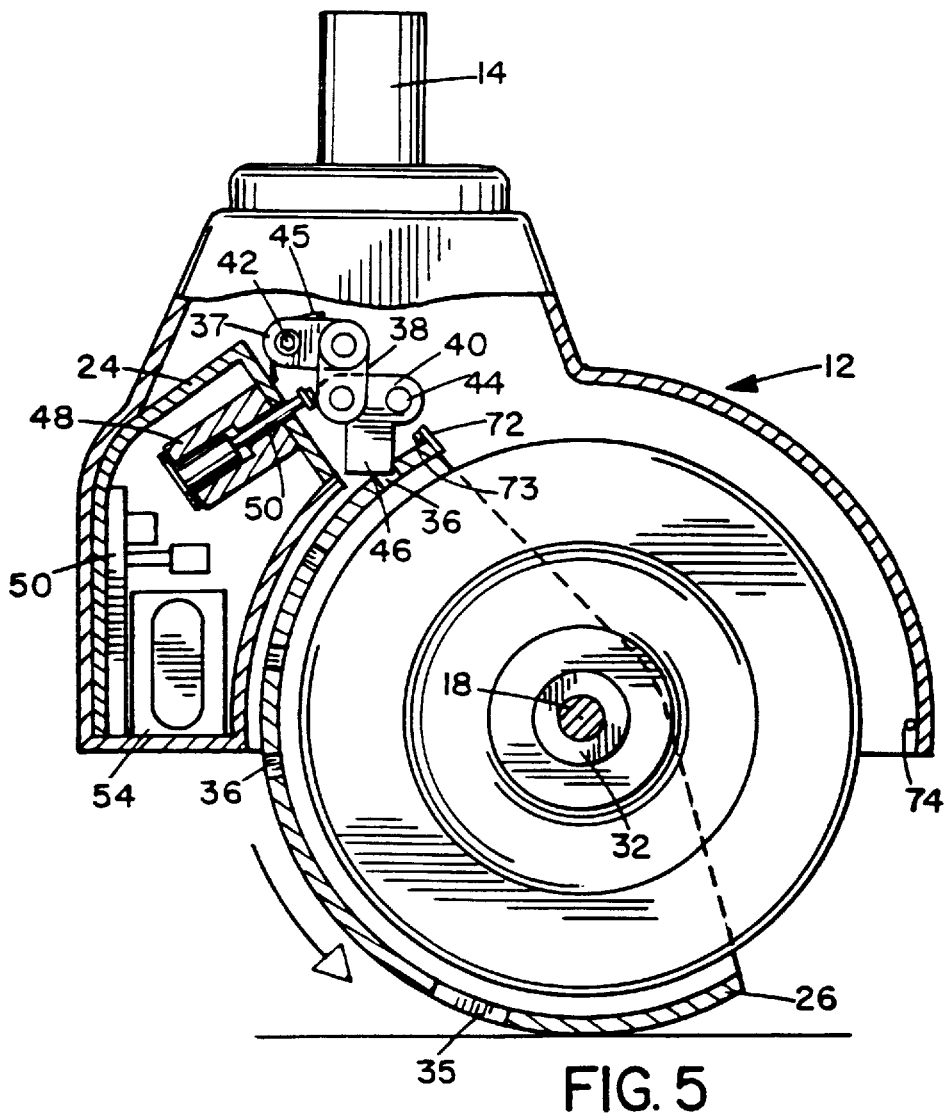
FIG. 5 is a view similar to FIG. 3, with the mechanism in the actuated position.
Figure 6:
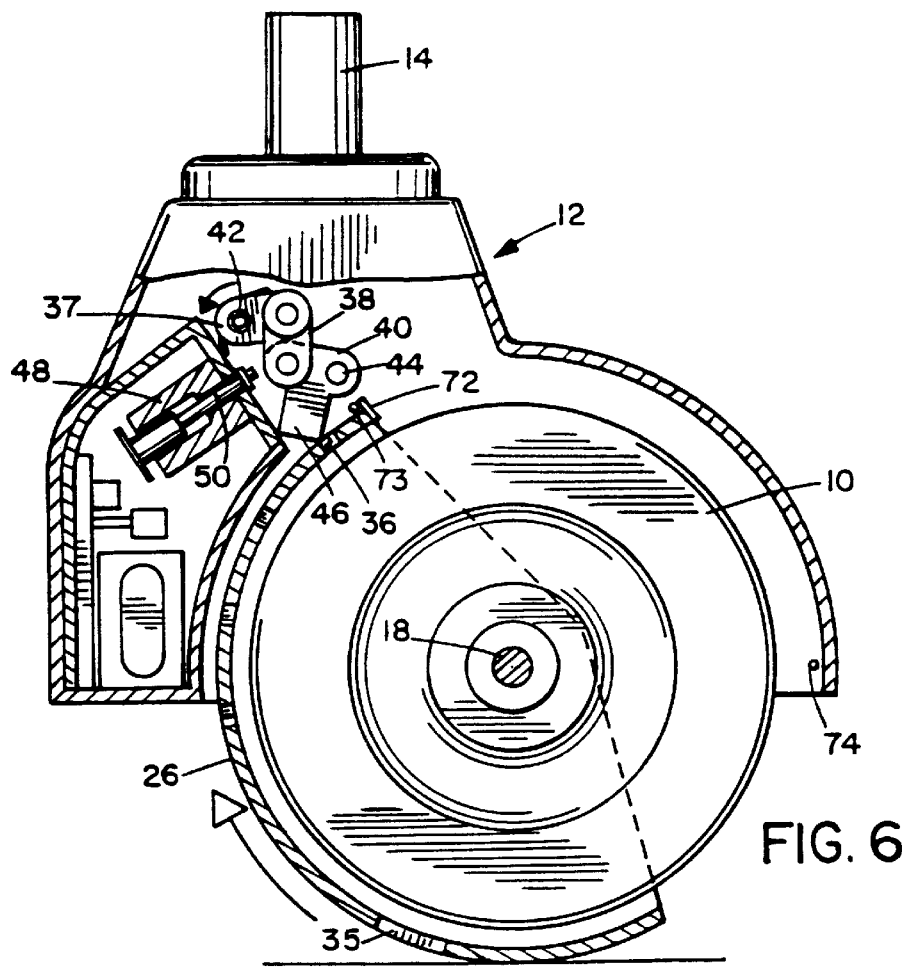
FIG. 6 is a view similar to FIG. 5, with the mechanism in the reset position.

The wheel 10 can no longer roll along the ground when the shell is in the actuated position of FIG. 5, and motion of the cart is impeded. At the same time, the shell partially encloses the wheel and shields it from the ground, so that the wheel does not become damaged in the event that the cart user attempts to push the cart on three wheels. The shell also reduces the risk of damage to the pavement, since the arcuate wall can slide along the ground without unduly damaging it. This system will deter people from removing protected carts from a store parking lot, due to the difficulty of moving a cart when one of the wheels is disabled as illustrated in FIG. 5. The user cannot tamper with the locking apparatus or attempt to disable it, since the apparatus is enclosed within the housing 12, and the actuator circuit and solenoid are also enclosed within a module housing which also blocks access to the locking linkage.

When the shopping cart is retrieved for return to the store, store personnel can readily deactivate the locking mechanism using a special key. An access hole 75 in caster housing 12 provides access to a key hole 76 in the upper locking link 37. The key hole 76 may be of any suitable key shape, such as hexagonal. The key shank (not illustrated) is suitably shaped for keying engagement in hole 76. Once engaged, the key is rotated in the direction of the arrow in FIG. 6, rotating link 37 downwardly and simultaneously raising link 38 and 40, and raising pawl 46 out of opening 36. At this point, the shell can be manually rotated back up into the housing, as indicated by the arrow in FIG. 6, until stop 72 engages a second limit pin 74. The key is removed from key hole 76, releasing link 37. The link 37 is then biased back in the opposite direction by spring 45. As soon as the opening 35 moves back into alignment with pawl 46, the linkage will snap back into the extended position of FIG. 3 under the action of spring 45, simultaneously pushing the solenoid plunger 50 back into the retracted position, and locking the shell in the raised position to permit normal travel of the cart.

Since the locking shell completely encloses a portion of the wheel when deployed, it will protect the wheel against damage if a person attempts to roll the cart when the wheel is disabled. It also restricts individuals from attempting to tamper with the locking mechanism, as they may otherwise be tempted to do if the mechanism is partially exposed. The shell can only be released and moved back into the inoperative position by an individual with the appropriate key, so that unauthorized individuals will be unable to release the lock and would be unaware of how such a release can be done. The apparatus does not require major redesign of an entire caster, but simply requires replacement of an existing caster with the assembly as illustrated in FIGS. 1–6. The wheel 10 is preferably smaller than a conventional wheel of a caster, to provide the space necessary to mount shell 20. Preferably, wheel 10 has a 4-inch diameter, rather than a conventional 5-inch diameter. Thus, existing carts can readily be modified to incorporate the security or locking apparatus.

FIGS. 1–6 illustrate one example of a suitable actuator and locking device for locking the shell 20 in its retracted and operative positions. In this embodiment, the locking latch is actuated by a solenoid. However, in alternative embodiments, the solenoid plunger itself may be the locking member and engage directly in the shell openings. Also, although the shell has openings for receiving the locking device and pawl in the illustrated embodiment, other possible formations may be used, such as recesses, projections, teeth, or the like, for engaging with a suitable lock member.

FIGS. 9–11 illustrate an alternative embodiment in which the locking device is actuated by a motor. Also in the embodiment of FIGS. 1–6, a custom housing 12 is used to replace the conventional yoke provided in a conventional caster. In the embodiment of FIGS. 9–11, the wheel 80 is rotatably mounted on a conventional style yoke 81 via axle 82, and the actuator and locking mechanism are mounted in a separate, clam shell housing 84 which clamps over the yoke 81. Housing or fairing 84 may be of injection molded plastic material, molded in two halves which clamp around the yoke 81 and snap together or are fastened together in any suitable manner. With this arrangement, the security device can be simply mounted on top of the existing yoke of a conventional caster.

It will be understood that a clam shell housing similar to housing 84 may alternatively be used to house the security mechanism of the previous embodiment, instead of the custom housing 12 illustrated which replaces the conventional yoke. Similarly, a custom housing may be used in this embodiment instead of conventional yoke 81 and clam shell housing 84.

As in the previous embodiment, a shell 85 is rotatably mounted on axle 82 between the wheel and the housing 84. The shell 85 is of metal or other strong material, and has an arcuate wall 86 extending around slightly less than half of the outer periphery-of the wheel, with a width greater than the wheel width, and opposite side walls 87,88 extending down on opposite sides of the wheel and rotatably mounted on axle 82. Each side wall is sector-shaped and has a radius slightly greater than the wheel diameter, spacing arcuate wall 86 from the wheel rim. Thus, shell 85 completely encloses part of the wheel, as in the previous embodiment. The shell outer wall 86 has a series of spaced latch openings 89 around its periphery.

A latch member 90 is pivotally supported on pin 92 and is connected via link 93 to a lead screw 94 driven by motor 95. When the shell 85 is in the uppermost, retracted position, the latch member 90 is driven into its operative position engaging in the lowermost opening 89 to lock the shell in position during normal operation of the cart, as illustrated in FIG. 9. A separate pawl 96 is rotatably mounted on pin 92 adjacent the latch member 90, as best illustrated in FIGS. 10 and 11. Pawl 96 is biased by spring 97 towards the shell 85, so that it rides against the outer surface of the shell.

The motor 95 may be actuated in a similar manner to solenoid 48 of the previous embodiment, as described above in connection with FIGS. 7 and 8, and the same basic transmitter and receiver system may be used. However, the pulse generator 69 preferably has a 450 mS cycle, rather than 20 mS as was used for the solenoid embodiment. A suitable battery 110 is mounted in the housing 84 for operating motor 95, for example as illustrated in FIG. 10. The control circuit for operating motor 95 is preferably the same as that illustrated in FIG. 8 for the solenoid, as mentioned previously. Thus, a suitable signal is detected by a receiver which in turn switches the motor on for a sufficient length of time to retract the latch member.

Once actuated, the motor drives screw 94 to rotate so as to retract nut 97 to which the link 93 is coupled. This acts to rotate latch member 90 upwardly out of the opening, releasing the shell. The motor is then switched off, holding the latch member in the retracted position. The shell is then free to rotate downwardly into an operative position in which it is in contact with the ground surface and raises the wheel above the ground, in an equivalent position to shell 20 in FIG. 5 of the previous embodiment. In this position, the pawl 96 is urged by spring 97 into the uppermost latch opening 89, as indicated in FIG. 11, preventing rotation of the shell in a clockwise direction back towards the inoperative position. A stop 98 on shell 85 engages a pin 99 on the motor supporting plate in this position, as illustrated in FIG. 11, to prevent further rotation of the shell in a counterclockwise direction beyond the locked, operative position of FIG. 11. Stop 98 engages a second limit pin 111 on the housing when the shell reaches the retracted or inoperative position of FIG. 9. It will be understood that stop pins 99 and 111 may be replaced with any alternative stop configuration and need not be pins.

As in the previous embodiment, when the shell is locked in the operative position of FIG. 11, where the shell engages the ground and continued forward motion of the cart lifts the wheel 80 off the ground, it will be impossible to push the cart and make it travel over the ground in a normal manner. Thus, if a user attempts to exit the designated area with the cart, the motor is actuated to release the latch member, and the shell will roll down to raise the wheel and render it inoperative, as in the first embodiment. As the shell rotates down, the pawl 96 will travel over the surface of the shell and engage in successive openings 89 in a ratcheting manner, preventing any attempt to rotate the shell back in the opposite direction after release of the latch member.

FIG. 12 illustrates a possible resetting unit 100 for resetting the shell and latch when the cart is returned to the designated area. Unit 100 has a pair of projecting electrical probes 102 which engage corresponding probes 103 on the motor when the device is inserted through a suitable opening (not illustrated) in the housing 84. Probes 102 are activated by suitable batteries 104, and a button (not illustrated) will be provided on the unit 100 so that the user can activate the probes at the appropriate time. In order to reset the security device of FIGS. 9–11 when the shell is in the position illustrated in FIG. 11, the pawl 96 must first be lifted out of opening 89 to permit the shell to be manually rotated back into the inoperative position of FIG. 9. This may be done by a suitable mechanical key or the like, as described in connection with the previous embodiment. Once the pawl 96 has been released, the operator rotates the shell back upwardly and into the housing 84, until it reaches the position illustrated in FIG. 9, where stop 98 engages limit pin 111, preventing rotation beyond the position illustrated in FIG. 9. Once the stop pin is reached, the operator holds the shell up while inserting the probes 102 to touch battery probes 103. The unit 100 is then activated, which in turn activates battery 95 to drive the screw 94 back in the opposite direction, rotating latch member 90 back into the lowermost opening 89, until the position illustrated in FIG. 9 is reached. The motor then turns off again.

Suitable switches, timing circuits or motor limit switches (not illustrated) are provided for switching the motor off when the latch member 90 reaches the retracted position of FIG. 11 and the operative position of FIG. 9, respectively. The motor actuator of FIGS. 9–11 is preferred over the solenoid actuated version of FIGS. 16, since the motor will require less power to operate than the solenoid, and will be less likely to be subject to false triggering. However, both versions will be equally effective.

FIGS. 13–15 illustrate a caster unit 120 with a security device or mechanism according to another embodiment of the invention for impeding movement of a shopping cart if a user attempts to remove the cart from a designated area. The unit 120 includes an outer yoke or housing 122 which encloses part of wheel 124 as well as the security device in the armed, inoperative position of FIG. 13. Wheel 124 is rotatably mounted on axle 126 which is secured between opposite side walls 127 of the housing 122.

The security apparatus in this embodiment basically comprises a braking member or shell 128 which has opposite side walls 129 extending over opposite side faces of the wheel and rotatably supported on axle 126, as in the previous embodiments, and as illustrated in FIG. 15. A curved or arcuate outer wall 130 of the shell extends around part of the periphery of the wheel but is spaced outwardly from the wheel rim so as to not impede normal rotation of the wheel when the security device is not actuated, as in the previous embodiments. Again, although the shell extends over an angle of around 180° in the illustrated embodiment, the sector angle enclosed by the shell may be greater or less than that illustrated, and any sector angle in the range from 20° to 210° may alternatively be used.

The latching mechanism for releasably securing the shell in the raised or inoperative position of FIG. 13 is similar to that of FIGS. 9–12 although it is oriented in the opposite direction. As in the previous embodiment, a latch member 132 is pivotally mounted on pin 134 and is linked via nut 135 to a lead screw 136 driven by motor 138 so as to move between the latched position of FIG. 13 and the released position of FIG. 14. The arcuate wall 130 of the shell has a first opening, recess or the like 139 positioned to receive a latch finger 140 on latch member 132 when the shell is in the raised, inoperative position, as illustrated in FIG. 13.

A spring loaded pawl 142 is also pivotally mounted in the housing 122 above the latch member via pivot pin 143, and is biased by spring 144 against the shell wall 130, as best illustrated in FIG. 15. The wall 130 has a series of ratchet openings 145 for ratcheting engagement with pawl 142 as the shell moves between the inoperative position of FIG. 13 and the actuated position of FIG. 14.

The motor 138 may be actuated in a similar manner to the solenoid of the first embodiment and the motor of the second embodiment described above, as illustrated in FIGS. 7 and 8. A suitable perimeter transmitter, such as that illustrated in FIG. 7, emits a signal which is detected by the receiver of FIG. 8 in order to switch on motor 138 for a predetermined time period sufficient to retract finger 140 from opening 139. The screw 136 is rotated in order to drive the nut outwardly away from the motor housing, simultaneously rotating latch member 132 in a clockwise direction, retracting finger 140 from opening 139. Once the finger is retracted, the shell 128 is free to rotated downwardly in a counterclockwise direction in which it is contact with the ground surface and raises the wheel from the ground, in a similar manner to the previous embodiments.

As the shell rotates down, pawl 142 will ride over wall 130 and engage in ratchet openings 145 to prevent movement of the shell back in a clockwise direction. The housing side walls 127 each have an in-turned tab 146 along their respective lower edges. The tabs act as stops for the shell when it reaches the actuated position of FIG. 14, where the lower edges of the shell side walls 129 abut against the stop tabs 146. In this position, pawl 142 engages in the last of the three ratchet openings, preventing retraction of the shell from the actuated position. Thus, the shell is effectively locked against rotation in either direction when it reaches the position of FIG. 14.

When the shell touches the ground as it deploys, continued forward motion of the cart lifts the wheel off the ground and impedes further movement of the cart without dragging the shell along the ground. This makes it difficult to push the cart outside the designated boundary, which is normally the edge of the store parking lot. As in the previous embodiments, the deployment of the shell, which occurs automatically when a user attempts to leave the designated area, will provide a significant deterrence to theft of carts and will be very difficult to circumvent.

A suitable reset device 148 is provided for use by store personnel to reset the shell in the armed, inoperative position when an abandoned, locked cart is collected. When the shell is in the deployed, actuated position of FIG. 14, the latch member is retracted and the motor is off, and the pawl 142 is engaged in the last of the ratchet openings 145. The reset device 148 is a battery operated wand which acts to lift the pawl out of opening 145 so that the shell can be manually rotated back into the inoperative position of FIG. 13, and also actuates the motor to drive the latch member back down so that finger 140 again engages in opening 139.

Device 148 has a handle portion 149 which holds battery 150, and first and second contact probes 151,152 projecting from the handle portion 149. The first contact probe 151 also comprises a lifting member with a tapered lifting edge 153. One side wall 127 of the housing 122 is provided with a first opening 154 for receiving contact probe 151, and a second opening 155 for receiving the second contact probe 152, as illustrated in FIG. 15. A contact 156 within the housing is aligned with opening 155 and is suitably connected to the motor. A second contact (not illustrated) is arranged to contact lifting probe 151 as the probe is inserted into the housing. The handle portion has a suitable power switch (not illustrated) for connecting the battery to the contacts.

In order to return the shell to the inoperative position, the operator simply inserts contact probe 151 through opening 154 and contact probe 152 through opening 155. Opening 154 is suitably aligned with the pawl 142 so that the tapered lifting edge 153 will contact the lower edge 158 of the pawl, and lift the pawl completely out of opening 145 when the probe is fully inserted. At the same time, contact probe 152 will touch contact 156 inside the housing, and the probe 151 will touch another motor actuating contact. The operator now manually rotates the shell back up into the housing until the lower edges of the shell again reach the stop tabs 146. At this point, the latch opening 139 will again be aligned with the latch finger. The operator switches on the reset device, which turns on the motor to rotate the screw 136 in the opposite direction, moving nut 135 back towards the motor housing and simultaneously rotating the latch member in a counterclockwise direction so that finger 140 again engages in opening 139 to lock the shell in its raised position, where normal movement of the cart will not be impeded.

In each of the embodiments described above, the shell partially encloses the wheel and prevents damage to the wheel if a user attempts to move the cart when the shell is in the lowered, operative position. It will also reduce the risk of damage to the pavement if the cart is pushed, due to the smooth, arcuate wall of the shell which contacts the pavement. However, it will be understood that, rather than a hollow shell with two side walls 27,28 as in the illustrated embodiments, one of the side walls may be eliminated. Alternatively, a single side wall 27 or 28 may be used as the braking member, with the remainder of the shell eliminated. The rim of the side wall projects beyond the periphery of the wheel, so that when the side wall rim engages the ground, the wheel is lifted up and rendered inoperative. The locking device may be arranged to engage openings in the single wall forming the braking member in this alternative. Although this will nor protect the wheel surface as well as the shells of the previous embodiments, it uses less material and may be easier to install.

The security device of this invention will be difficult to tamper with since it is enclosed in an outer housing, and can only be released by an operator with a special key or key and probe unit. The device is relatively easy and inexpensive to install on existing caster wheels, so that shopping carts can be readily modified to deter casual theft or removal.

When actuated and deployed in the ground engaging position, the braking or locking shell of this invention will stop the cart from rolling and simultaneously protects the plastic wheel from wearing or flat spots. Up to now, prior art braking devices have often simply locked the wheel against rotation while it still contacts the ground, resulting in wear as the wheel is dragged along the ground, and subsequent development of flat spots. Such wear is particularly encountered during the months immediately following installation, when such security devices are typically subject to the greatest challenge from curious or angry shoppers. The shell is preferably of a strong, durable metal such as steel. The presence of the steel shell, when deployed, is immediately obvious to the shopper, and acts to deter attempts to remove or steal the cart. Even when in the inoperative position, the presence of a security device is immediately apparent to the shopper and will have a deterrent effect. This is not true of previous wheel braking devices which were within the wheel or otherwise housed in a manner which did not reveal their presence or whether or not they were actuated.

The security device of the above embodiments is of simple design, with only a limited number of moving parts, resulting in more reliable operation and lower maintenance than previous, more complex designs. Previous shopping cart devices have been shown in use to experience extremely high failure rates, requiring intensive maintenance efforts which are both expensive and burdensome, as well as being annoying for shoppers who are using the carts properly within the store or parking lot confines. The security device of this invention is believed to be significantly more reliable and less subject to failure or accidental actuation than prior art devices, reducing both installation and maintenance costs.

Although some preferred embodiments of the invention have been described above by way of example only, it will be understood by those skilled in the field that modifications may be made to the disclosed embodiments without departing from the scope of the present invention, which is defined by the appended claims.

We claim:

1. A security apparatus for a shopping cart having a plurality of wheels, comprising:

a braking member for rotatably mounting on a wheel axle for movement between a raised position spaced above the ground surface and an operative position contacting the ground surface, the braking member having a portion projecting radially outwardly from the outer peripheral rim of the wheel at least in said operative position so as to lift the wheel from the ground and impede movement of a shopping cart;

a locking device for releasably locking the braking member in the raised position; and a trigger device for releasing the locking device in response to a signal from an electrical signal system extending around an area in which carts are to be retained, whereby the braking member can rotate into the operative position.

2. The apparatus as claimed in claim 1, wherein the braking member comprises a hollow shell enclosing at least a sector of the wheel.

3. The apparatus as claimed in claim 2, wherein the shell has an outer arcuate wall for extending around part of the outer periphery of a wheel, and parallel side walls for extending over part of the front and rear faces of the wheel, whereby the wheel is partially enclosed within the shell.

4. The apparatus as claimed in claim 1, including a housing for securing to a caster, the locking and trigger devices being mounted in the housing adjacent said shell.

5. The apparatus as claimed in claim 1, wherein the braking member has first and second spaced formations for engaging said locking device in the retracted position and the operative position, respectively.

6. The apparatus as claimed in claim 5, wherein the locking device comprises a retractable lock member and biasing means for biasing the lock member into an advanced position extending into engagement with one of said two formations, and the trigger device comprises means for retracting the locking device away from the first formation when actuated.

7. The apparatus as claimed in claim 6, wherein said formations comprise openings.

8. The apparatus as claimed in claim 1, including a biasing device for biasing the braking member into the operative position.

9. The apparatus as claimed in claim 1, wherein the trigger device comprises an electromechanical actuator for engaging the locking device to release the braking member.

10. The apparatus as claimed in claim 1, wherein the trigger device comprises a motor for driving the locking device to release the braking member.

11. A combined shopping cart caster and security assembly, comprising:

a wheel supporting yoke;

a wheel axle secured to the yoke;

a wheel rotatably mounted on the axle, the wheel having an outer peripheral rim for rolling along a ground surface;

a braking member rotatably mounted on the axle for movement between a raised position spaced above the ground surface and an operative position contacting the ground surface, the braking member having a portion projecting radially outwardly from the outer peripheral rim of the wheel at least in said operative position so as to lift the wheel from the surface and impede motion of the shopping cart;

a locking device movable between an advanced position locking the braking member in the raised position, and an inoperative position releasing the braking member; and an electrical actuator for moving the locking device into the inoperative position in response to movement of the wheel outside a predetermined area, whereby the braking member moves into the operative position to prevent further rotation of the wheel.

12. The assembly as claimed in claim 11, including a biasing device for biasing said locking device into said advanced position in the raised and operative positions of said braking member, whereby said locking device locks said braking member in both said raised position and said operative position.

13. The assembly as claimed in claim 12, wherein said braking member has at least two spaced openings for receiving said locking device in said raised and operative positions, respectively.

14. The assembly as claimed in claim 11, including a pawl member and biasing means for biasing said pawl member against said braking member, the braking member having a series of spaced openings, said pawl member having a ratcheting engagement in said openings to permit rotation of said braking member in a first direction between said raised and operative positions, and preventing rotation of said braking member back out of said operative position.

15. The apparatus as claimed in claim 11, wherein the braking member comprises a hollow shell enclosing at least a sector of the wheel.

16. The apparatus as claimed in claim 15, wherein the sector has an angle in the range from 20° to 210°.

17. The apparatus as claimed in claim 16, wherein the sector angle enclosed by the shell is approximately 160°.

18. The apparatus as claimed in claim 11, wherein said yoke comprises a housing enclosing at least part of said wheel and braking member in said raised position, said locking device and actuator being mounted in said housing.

* * * * *